United States Patent Office 2,980,581
Patented Apr. 18, 1961

---

2,980,581

THIOPHOSPHORIC ACID ESTERS AND PROCESS FOR THEIR MANUFACTURE

Gerhard Schrader, Wuppertal-Cronenberg, Germany, assignor to Farbenfabriken Bayer Aktiengesellschaft, Leverkusen, Germany, a corporation of Germany No Drawing. Filed Dec. 2, 1957, Ser. No. 699,935

Claims priority, application Germany Dec. 21, 1956

2 Claims. (Cl. 167—33)

The present invention relates to and has as its objects thiophosphoric acid esters of the general formula

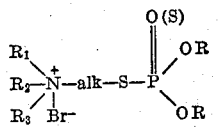

in which R stands for lower alkyl radicals, especially such ones having from 1 to 4 carbon atoms, alk stands for a lower alkylene chain having also from 1 to 4 carbon atoms, $R^1$, $R^2$ and $R^3$ stand for groups forming a quaternary ammonium salt.

In accordance with the present invention it has been found that S-bromoalkyl-O,O-dialkyl-thiol- or thiolthionophospheric acids easily react with tertiary amines to yield compounds of the above shown type. This reaction may be shown by the following equation:

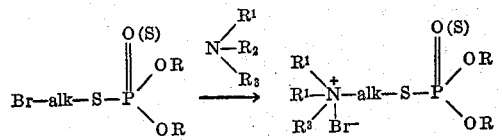

in which R, $R^1$, $R^2$, $R^3$ and alk have the same significance as described above.

Suitable for this reaction are generally tertiary amines that means in which none of $R^1$, $R^2$ and $R^3$ are hydrogen. $R^1$, $R^2$ and $R^3$ together with N may also form a heterocyclic nucleus of aromatic nature such as pyridine.

The reaction may be carried out with or without using suitable inert solvents. The reaction largely depends upon the nature of the tertiary amine used to carry out this reaction. Pyridine needs temperatures, say up to about 60 to 90° C.

The compounds of the present invention are easily water-soluble and thus may be used in aqueous solutions as contact insecticides and systemic agents for the control of pests. Some of the new compounds are also of interest as pharmaceutical products on account of their highly physiological action. Most of the compounds are strong cholinesterase inhibitors. The new pesticides may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned, water (if necessary with commercial emulsifiers, which however in most cases is absolutely unnecessary, because of the high water solubility of the inventive compounds) alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the inventive compounds the compound of the following formula

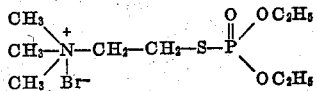

has been tested against spider mites and caterpillars. Aqueous solutions have been prepared by simply dissolving the compound in water to a concentration as indicated below. The tests have been carried out as follows:

(A) Against spider mites, *Tetranychus altaeae*, V. Hanst, (two spotted spider), on *Phaseolus vulgaris* plants which have been sprayed to the run off by the aqueous emulsions as prepared above.

(B) Against caterpillars of *Plutella cruciferarum*, Zell, (diamond back moth), on young plants of white cabbage which have been sprayed with the above prepared aqueous dilutions to the run off.

Killing effect in each case has been determined after 24 hours. The following results have been obtained: spider mites were killed completely with solutions of 0.01% and caterpillars were killed completely with 0.1% solutions.

The following examples are given by way of illustration only without limiting the present invention thereto:

*Example 1*

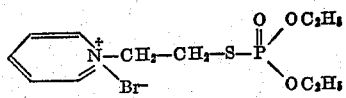

20 grams of pyridine are added dropwise with stirring to 70 grams of β-bromethyl-thiolphosphoric acid diethyl ester. The reaction product is heated to 60° C. for 4 days and then taken up with water. The product is completely water-soluble. A 50 percent aqueous solution shows a $DL_{50}$ of 100 mg./kg. on rats orally. 0.1 percent aqueous solutions yield a 100 percent systemic action on aphids.

By the same way but using exactly the equimolecular amount of β-bromo-ethyl-thiolthionophosphoric acid diethyl ester there is obtained the dithiophosphoric acid ester of the following formula

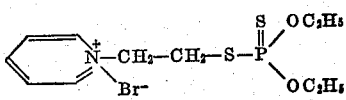

I claim:

1. The thiophosphoric acid ester of the following formula

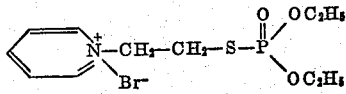

2. A process for combating insects which comprises treating said insects with a compound corresponding to the following formula:

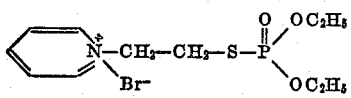

References Cited in the file of this patent
UNITED STATES PATENTS

| | | |
|---|---|---|
| 2,911,430 | Fitch | Nov. 3, 1959 |

FOREIGN PATENTS

| | | |
|---|---|---|
| 665,315 | Great Britain | Jan. 23, 1952 |
| 524,353 | Belgium | May 17, 1954 |

OTHER REFERENCES

Renshaw et al.: J. Am. Chem. Soc., vol. 51, page 954 (1929).

Ghosh et al.: "Chem. and Ind.," Jan. 29, 1955, page 118.

Tammelin: "Acta Chem. Scand." 11, pages 1340–1349 (August 1957).

Koelle et al.: "J. Pharmacol. Exper. Therap.," vol. 118, p. 421 (December 1956).

Leopold et al.: "A.M.A. Archives of Ophthalmology," 58, pp. 363–366 (September 1957).